J. D. BASCOM.
TOW LINE PACKAGE.
APPLICATION FILED FEB. 23, 1911.

1,009,633.

Patented Nov. 21, 1911.

Witnesses:
George G. Anderson
Harry H. Peiss

Inventor:
Joseph D. Bascom,
By Hugh K. Wagner,
His Attorney.

UNITED STATES PATENT OFFICE.

JOSEPH D. BASCOM, OF ST. LOUIS, MISSOURI.

TOW-LINE PACKAGE.

1,009,633.  Specification of Letters Patent.  Patented Nov. 21, 1911.

Application filed February 23, 1911. Serial No. 610,402.

*To all whom it may concern:*

Be it known that I, JOSEPH D. BASCOM, a citizen of the United States, residing at the city of St. Louis, State of Missouri, have invented certain new and useful Improvements in Tow-Line Packages, of which the following is a specification.

This invention relates to tow-line packages, and has for its object to provide an improved tow-line that is particularly adapted for use in towing automobiles and other vehicles.

The tow-line consists of a wire rope or cable having means for attaching either end thereof to an axle or the framework of an automobile or other vehicle and, when not in use for towing, the tow-line can be carried as part of the equipment of the automobile or other vehicle, the rope or cable being coiled and the attaching means being contained wholly within the coil, so that the complete towing outfit is relatively small and very compact and takes up practically no more space than the coil itself.

Figure 1:
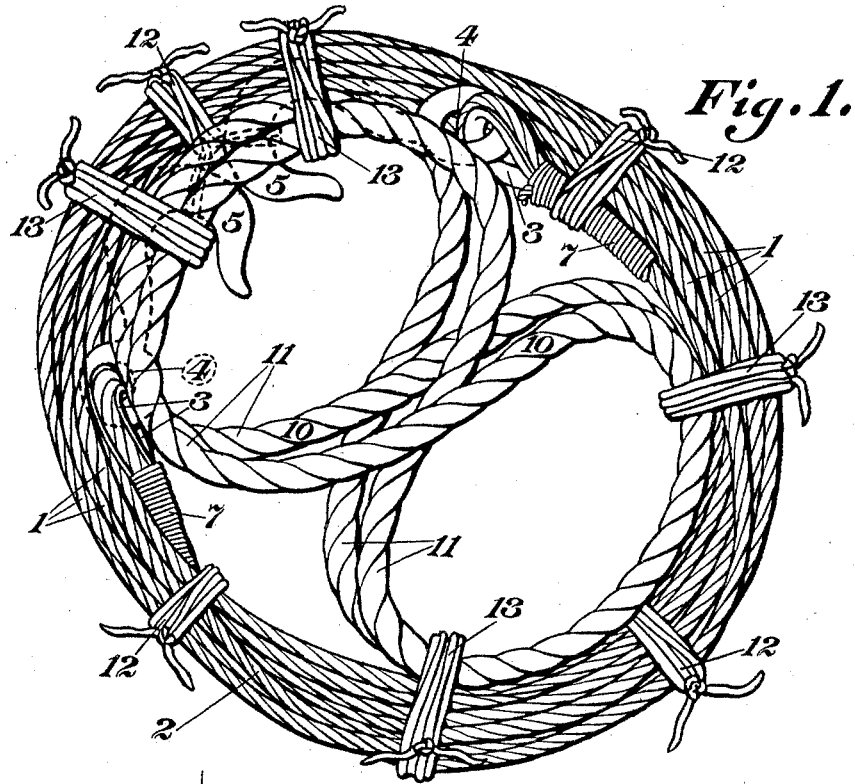
Figure 2:
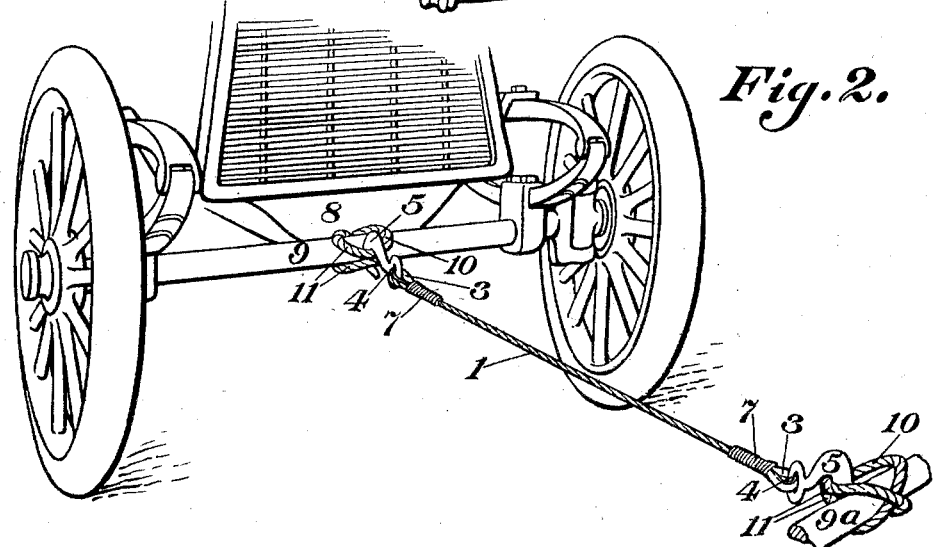

In the accompanying drawings forming part of this specification, in which like numbers of reference denote like parts wherever they occur, Figure 1 is a top plan view of a complete tow-line, as it appears when coiled; Fig. 2 is a perspective view of the front end of an automobile with the tow-line attached to the front axle.

As a wire rope is considerably thinner than either a hemp or cotton rope having the same ultimate strength, it is for this reason that the rope 1 is preferably formed of wire, so that, when same is arranged in a coil 2, as hereinafter described, said coil will take up less room than a coil that is formed of either a hemp or cotton rope having the same strength and length of said wire rope. Each end of the rope 1 is provided with a thimble 3, which passes through an eye 4 of a hook 5, said rope being bent to fit into the concaved exterior side of said thimble, after which the end of said rope is spliced in the usual manner to the main part thereof and secured thereto by means of wire seizing 7. The cross-sectional configuration of each hook 5 is preferably oval-shaped, the thickness of same being less than the width thereof so that the hook is relatively flat. When the rope 1 is used as a tow-line for an automobile 8 or other vehicle, the hook 5 at one end of the rope 1 is preferably attached to the front axle 9 of said automobile by means of a sling 10, and the hook 5 at the other end of the rope 1 is preferably attached by means of another sling 10 to the rear axle $9^a$ of another automobile (not shown) by means of which the automobile 8 is drawn, or if desired, the last-mentioned hook 5 can be attached to a swingletree or doubletree (not shown), so that the automobile 8 can be drawn by a horse or horses. The sling 10 that is attached to the axle 9 and the sling 10 that is attached to the axle $9^a$ are located at or near the centers of said axles so that the pull upon rope 1 causes the automobile 8 to travel in the proper direction without skidding.

Each sling 10 is preferably formed of hemp or the like and is twisted so that naturally it assumes an 8-shaped or other configuration, when it is not attached to either of the axles 9 or $9^a$ or when it is attached to the coil 2 in the manner hereinafter described. In order to attach a sling 10 to the axle 9, said sling is held with the parts thereof that cross each other against the rear side of the axle after which the upper loop 11 of said sling is bent forwardly over the top of the axle and the lower loop 11 of said sling is bent forwardly underneath the axle, so as to meet the upper loop 11 in front of the axle, and then one of the hooks 5 is passed through both of said loops, thus holding said sling firmly around the axle. The other sling 10 is similarly attached to the axle $9^a$ so that the parts of said sling that cross each other are located on the front side of said axle. By this arrangement of each sling 10, the pull upon same is distributed to four thicknesses thereof, whereby each sling is capable of sustaining a pull four times as great as its allowable working strength. By reason of using a hemp sling 10, same can be attached to either of the axles 9 or $9^a$, as hereinabove described, more readily than a wire rope, and will grip the axle with sufficient firmness to prevent same from sliding back and forth upon the axle, and will not scratch or wear the paint off the axle as would be the result if a wire rope were used.

When the rope 1 is not in use for towing purposes, or the like, same is arranged into a coil 2, and the several loops of the coil are bound firmly together by a cord or wire 12 or a plurality of such cords or wires. In arranging the rope 1 in a coil 2, the length of each loop thereof is predetermined approximately so that the two hooks 5 will touch or nearly touch each other, and then the hooks 5 are connected by one of the cords or wires 12 that binds the several loops of the coil 2 together. In practice it is preferable to use four cords or wires 12 for binding the several loops of the coil 2 together and said cords or wires are spaced at approximately equal distances apart, one of said wires being used to connect the hooks 5 and to bind said hooks to the coil 2 as well as to bind the several loops of the coil together, another one of said cords or wires being preferably located directly opposite the hooks 5, and the two remaining cords or wires being used to bind the two ends of the rope to the coil 2 as well as to bind the several loops of the coil together. The two endless slings 10 in their 8-shaped or other configuration are then placed one upon the other within the open space surrounded by the coil 2 and are bound to said coil by means of a cord or wire 13 or a plurality of such cords or wires. In placing the slings 10 within the coil 2, said slings are preferably arranged so that the loops 11 of one are approximately above the loops 11 of the other, and, also, that a loop 11 of each sling rests upon the hooks 5. It is preferable to use four cords or wires 13 to bind the slings 10 to coil 2, two of said cords or wires being used to bind the two loops 11 that rest upon hook 5, and the two remaining cords or wires being used to bind the other two loops 11 to said coil. In binding the two loops 11 that rest upon the hooks 5 to the coil 2, the two cords or wires 13 are preferably passed through the hooks 5, respectively, and are thereby prevented from slipping in either direction on said coil. By reason of the hooks 5 being relatively flat, the combined thickness of either hook and a sling 10 laid thereon is approximately the same as the thickness of the coil 2.

By arranging the rope 1 into a coil 2 and tying the slings 10 within said coil in the manner hereinabove described, the complete tow-line is extremely compact and takes up a relatively small amount of space and can be readily carried as part of the equipment of an automobile or other conveyance. Because of its compactness, it can be placed underneath the chauffeur's cushion seat where it will be free from abrasion and consequent injury such as it would suffer if carried in the tool-box or elsewhere in the machine.

From the foregoing description the manner in which the tow-line is used for towing an automobile or other conveyance that becomes stuck in the mud or otherwise disabled and, also, the manner in which the tow-line is formed into a package so that same can be carried as part of the equipment of an automobile or other conveyance are evident.

I claim:

1. A tow-line package comprising, in combination with the tow-line arranged in coiled form, a pair of endless slings for forming the means of connection between the tow-line ends and the vehicles, said slings being arranged in superimposed relation on the interior of said coil and having portions in engagement with substantially diametrically opposite points of said coil, and a series of cords tied around the convolutions of the coil and said portions of said slings to bind said parts together.

2. A tow-line package comprising, in combination with the tow-line arranged in coiled form and having a hook at each end which hooks are disposed adjacent to each other, a pair of endless slings for forming the means of connection between said hooks and the vehicles, said slings being arranged in superimposed relation on the interior of said coil and having portions in engagement with substantially diametrically opposite points of said coil, portions of said slings seating on said hooks, and a series of cords tied around the loops of the coil, some of said cords extending around the coil, portions of the slings adjacent to the hooks, and through said hooks.

In testimony whereof I hereunto affix my signature in the presence of two witnesses.

JOSEPH D. BASCOM.

Witnesses:
GLADYS WALTON,
GEORGE G. ANDERSON.

---

Copies of this patent may be obtained for five cents each, by addressing the "Commissioner of Patents, Washington, D. C."